US009666906B2

(12) United States Patent
Ho et al.

(10) Patent No.: US 9,666,906 B2
(45) Date of Patent: May 30, 2017

(54) HIGH VOLTAGE ELECTROLYTE AND LITHIUM ION BATTERY (71) Applicant: Nano and Advanced Materials Institute Limited, Hong Kong (HK)

(72) Inventors: Kam Piu Ho, Hong Kong (HK); Kwok Keung Paul Ho, Hong Kong (HK); Ranshi Wang, Hong Kong (HK); Yeming Xu, Hong Kong (HK); Wai Chun Luk, Hong Kong (HK); Mei Mei Hsu, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 250 days.

(21) Appl. No.: 14/709,525

(22) Filed: May 12, 2015

(65) Prior Publication Data
US 2015/0333373 A1 Nov. 19, 2015

Related U.S. Application Data (60) Provisional application No. 61/996,746, filed on May 15, 2014.

(51) Int. Cl.
H01M 10/0569 (2010.01)
H01M 10/0567 (2010.01)
H01M 10/0525 (2010.01)

(52) U.S. Cl.
CPC ... *H01M 10/0569* (2013.01); *H01M 10/0567* (2013.01); *H01M 10/0525* (2013.01); *H01M 2300/0037* (2013.01)

(58) Field of Classification Search
CPC ......... H01M 10/0567; H01M 10/0569; H01M 10/0525; H01M 2304/0037; H01M 2300/0037
See application file for complete search history.

(56) References Cited

U.S. PATENT DOCUMENTS

| 8,349,483 | B2 | 1/2013 | Yamashita et al. | |
|---|---|---|---|---|
| 8,679,685 | B2 | 3/2014 | Jeon et al. | |
| 8,815,454 | B2 | 8/2014 | Kim et al. | |
| 2004/0096750 | A1 | 5/2004 | Kim et al. | |
| 2006/0024577 | A1 | 2/2006 | Schwake | |
| 2009/0047582 | A1* | 2/2009 | Kim | H01M 10/0567 429/330 |
| 2010/0233549 | A1 | 9/2010 | Kim et al. | |
| 2010/0273065 | A1* | 10/2010 | Lee | H01M 10/0567 429/332 |
| 2012/0244445 | A1 | 9/2012 | Han et al. | |
| 2013/0224535 | A1 | 8/2013 | Matsuoka et al. | |
| 2016/0099115 | A1* | 4/2016 | Jayaraman | H01G 11/60 252/62.2 |

FOREIGN PATENT DOCUMENTS

| CN | 101385182 A | 3/2009 |
|---|---|---|
| CN | 103035946 A | 4/2013 |
| EP | 2592676 A1 | 5/2013 |
| WO | 2008138132 A1 | 11/2008 |
| WO | 2013062056 A1 | 5/2013 |

OTHER PUBLICATIONS

Search Report of counterpart European Patent Application No. 15167876.0 issued on Aug. 20, 2015.
S. Bach and N. Baffler et al., Rechargeable y-MnO2 for lithium batteries using a sulfone-based electrolyte at 150 ° C., Journal of Power Sources, 1993, pp. 569-575, vol. 43/44.
K. Xu and C.A. Angell, High Anodic Stability of a New Electrolyte Solvent: Unsymmetric Noncyclic Aliphatic Sulfone, Journal of the Electrochemical Society, Apr. 1998, pp. L70-L72, vol. 145, No. 4.
Ting Li and William D. Jones, DFT Calculations of the Isomerization of 2-Methyl-3-butenenitrile by [Ni(bisphosphine)] in Relation to the DuPont Adiponitrile Process, Organometallics, 2011, pp. 547-555, vol. 30, No. 3.
Hitoshi Ota et al., Analysis of Vinylene Carbonate Derived SEI Layers on Graphite Anode, Journal of the Electrochemical Society, 2004, pp. A1659-A1669, vol. 151.
A. Brandt, P. Isken et al., Adiponitrile-based electrochemical double layer capacitor, Journal of Power Sources, 2012, pp. 213-219, vol. 204.
Hugues Duncan et al., Electrolyte Formulations Based on Dinitrile Solvents for High Voltage Li-Ion Batteries, Journal of the Electrochemical Society, 2013, pp. A838-A848, vol. 160.
Andrew J. Gmitter et al., High Concentration Dinitrile, 3-Alkoxypropionitrile, and Linear Carbonate Electrolytes Enabled by Vinylene and Monofluoroethylene Carbonate Additives, Journal of the Electrochemical Society, 2012, pp. A370-A379, vol. 159.
P. Isken, et al. High flash point electrolyte for use in lithium-ion batteries, Electrochimica Acta, 2011, pp. 7530-7535, vol. 56.
Masatoshi Nagahama et al., High Voltage Performances of Li2NiPO4F Cathode with Dinitrile-Based Electrolytes, Journal of the Electrochemical Society, 2010, pp. A748-A752, vol. 157.
Abu-Lebdeh et al., High-voltage electrolytes based on adiponitrile for Li-ion batteries, Journal of the Electrochemical Society, 2009, pp. A60-A65, vol. 156.
Xiaoxi Zuo et al., Lithium Tetrafluoroborate as an Electrolyte Additive to Improve the High Voltage Performance of Lithium-Ion Battery, Journal of the Electrochemical Society, 2013, pp. A1199-A1204, vol. 160.
Yaser Abu-Lebdeh et al., New electrolytes based on glutaronitrile for high energy/power Li-ion batteries, Journal of Power Sources, 2009, pp. 576-579, vol. 189.
1st Office Action of counterpart Chinese Patent Application No. 201510247185.0 issued on Dec. 12, 2016.

\* cited by examiner

*Primary Examiner* — Laura Weiner (57) ABSTRACT

The present application discloses a high voltage electrolyte including an electrolyte solvent which includes a mixture of a dinitrile solvent and a nitrile solvent and is stable at voltage of about 5 V or above. The dinitrile solvent may include at least one selected from the group consisting of malononitrile, succinonitrile, glutaronitrile, adiponitrile, pimelonitrile, suberonitrile, azelanitrile and sebaconitrile. The nitrile solvent may include at least one selected from the group consisting of acetonitrile, propionitrile, butyronitrile, pivalonitrile and capronitrile. The present application also discloses a lithium ion battery including the above high voltage electrolyte. The lithium ion battery exhibits a cyclic performance of greater than about 300 cycles and with a capacity retention of greater than about 80%.

10 Claims, 11 Drawing Sheets

HIGH VOLTAGE ELECTROLYTE AND LITHIUM ION BATTERY

CROSS-REFERENCE TO RELATED APPLICATION

This application claims the benefit of U.S. Provisional Patent Application No. 61/996,746 filed on May 15, 2014, the entire content of which is hereby incorporated by reference.

FIELD OF TECHNOLOGY

The present application relates to high voltage electrolytes and lithium ion batteries containing the high voltage electrolytes.

BACKGROUND

The ever-growing demand of energy for modern society has prompted the need to develop efficient storage of electricity, meaning that one needs to have battery systems with high energy and power density, long lifetime and minimum production/disposal cost. In the last decade, a number of different battery systems such as nickel-metal hydride, sodium-sulfur, and lithium ion systems were found to have high potential for electric vehicles. Among them, lithium ion battery is considered to be the most promising candidate for this demanding application.

Conventional lithium ion batteries utilizing carbonate electrolytes provide working voltage of around 3.2-3.8 V and stable charging voltage up to around 4.3 V. The electrolyte becomes unstable at elevated voltages and may result in reduced cycle life and decreased safety of the lithium ion battery. There is, therefore, a need for improved electrolytes stable at an elevated voltage, such as greater than 5 V. There is also a need for further improving the reliability and performance of the batteries at high charging voltages.

SUMMARY

In one aspect, the present application provides a high voltage electrolyte including an electrolyte solvent which includes a mixture of a dinitrile solvent and a nitrile solvent. The electrolyte is stable at voltage of about 5 V or above.

In one embodiment, the high voltage electrolyte may further include one or more additives in an amount of about 0.1-10% by volume of the electrolyte solvent. The additives may be selected from the group consisting of vinyl carbonate (VC), 4-fluoro-1,3-dioxolan-2-one (FEC) and 4-vinyl-1,3-dioxolan-2-one (VEC).

In one embodiment, the dinitrile solvent may include at least one selected from the group consisting of malononitrile, succinonitrile, glutaronitrile, adiponitrile, pimelonitrile, suberonitrile, azelanitrile and sebaconitrile.

In one embodiment, the nitrile solvent may include at least one selected from the group consisting of acetonitrile, propionitrile, butyronitrile, pivalonitrile and capronitrile.

In one embodiment, the mixture of the dinitrile solvent and the nitrile solvent may be present in an amount of about 10-40% of the total volume of the high voltage electrolyte. In a particular embodiment, the mixture of the dinitrile solvent and the nitrile solvent may be present in an amount of about 25% of the total volume of the high voltage electrolyte.

In one embodiment, the volume ratio of the dinitrile solvent to the nitrile solvent may be in the range of about 90:10 to 50:50. In a particular embodiment, the volume ratio of dinitrile solvent to nitrile solvent may be about 75:25.

In one embodiment, the mixture of the dinitrile solvent and the nitrile solvent may include adiponitrile and butyronitrile.

In another aspect, the present application provides a lithium ion battery including a cathode, an anode and an electrolyte. The electrolyte includes a mixture of a dinitrile solvent and a nitrile solvent. The lithium ion battery is stable at voltage of about 5 V or above.

In one embodiment, the electrolyte may further include one or more additives in an amount of about 0.1-10% by volume of the electrolyte solvent. The additives may be selected from the group consisting of vinyl carbonate (VC), 4-fluoro-1,3-dioxolan-2-one (FEC) and 4-vinyl-1,3-dioxolan-2-one (VEC).

In one embodiment, the dinitrile solvent may include at least one selected from the group consisting of malononitrile, succinonitrile, glutaronitrile, adiponitrile, pimelonitrile, suberonitrile, azelanitrile and sebaconitrile.

In one embodiment, the nitrile solvent may include at least one selected from the group consisting of acetonitrile, propionitrile, butyronitrile, pivalonitrile and capronitrile.

In one embodiment, the mixture of the dinitrile solvent and the nitrile solvent may be present in an amount of about 10-40% of the total volume of the high voltage electrolyte. In a particular embodiment, the mixture of the dinitrile solvent and the nitrile solvent may be present in a concentration of about 25% of the total volume of the high voltage electrolyte.

In one embodiment, the volume ratio of the dinitrile solvent to the nitrile solvent may be in the range of about 90:10 to 50:50. In a particular embodiment, the volume ratio of dinitrile solvent to nitrile solvent may be about 75:25.

In one embodiment, the mixture of the dinitrile solvent and the nitrile solvent may include adiponitrile and butyronitrile.

In one embodiment, the lithium ion battery may have a cyclic performance of greater than about 300 cycles and with a capacity retention of greater than about 80%.

BRIEF DESCRIPTION OF THE DRAWINGS

The embodiments of the present application are described with reference to the attached figures, wherein.

DETAILED DESCRIPTION

In the following detailed description, numerous specific details are described in order to provide a thorough understanding of the application. However the present application may be practiced without these specific details. In other instances, well known methods, procedures, components have not been described in detail so as not to obscure the present application. Further, exemplary sizes, values and ranges may be given, but it should be understood that the present application is not limited to these specific examples.

An electrolyte has an important role in a battery especially with respect to the stability and charge-discharge cycling of the battery. The electrolyte may include a non-aqueous solvent, lithium salt and optionally one or more additives. To stabilize the battery under high working voltage, the solvent is selected to provide stability with respect to oxidation. One or more additives may be added to further stabilize the electrolyte during high charging voltage of the lithium batteries.

In one aspect, the present application provides a high voltage electrolyte which remains stable at a high voltage of about 5 V or greater.

The electrolyte of the present application may be determined through computational molecular orbital calculation and experimental determination. The highest occupied molecular orbital (HOMO) and lowest unoccupied molecular orbital (LUMO) energy values of electrolyte solvents and additive compounds may provide useful guidelines in the following experimental verification.

The electrolyte includes a non-aqueous solvent, a lithium salt and optionally one or more additives. In certain embodiments, the electrolyte may include a mixture of dinitrile and nitrile solvents, and a lithium salt. One or more additives may also be included to improve the stability and safety of the electrolytes as well as lithium ion batteries utilizing the electrolyte.

It has been surprisingly found that an electrolyte including a mixture of dinitrile solvent and nitrile solvent would still be stable at high charging voltage of about 5 V or higher. One or more additives may be added to further improve the stability and safety of the electrolyte as well as a lithium battery utilizing the electrolyte. The additives may be provided in a concentration of about 0.1 to 10% by volume of the electrolyte solvent.

It has also been found that a lithium ion battery utilizing the electrolyte can safely and stably be used at high voltage of about 5 V or higher, without a substantial decomposition of the electrolyte.

Various dinitriles may be used, such as those possessing the desired characteristics such as high anodic stability limits (>5 V (vs. $Li^+/Li$)), low melting point (e.g. glutaronitrile, $T_m$=-29° C.), high flash point (e.g. adiponitrile, $T_f$=163° C.) and high boiling point (e.g. adiponitrile, 295° C.). Another attractive characteristic of dinitriles is their relatively low cost.

In certain embodiments of the present application, the dinitriles may include one or more selected from the group consisting of malononitrile (DN-3), succinonitrile (DN-4), glutaronitrile (DN-5), adiponitrile (DN-6), pimelonitrile (DN-7), suberonitrile, azelanitrile and sebaconitrile.

Various nitriles may be used, such as those possessing the desired characteristics such as high boiling point and high oxidation resistance.

In some embodiments of the present application, the nitriles may include one or more selected form the group consisting of acetonitrile, propionitrile, butyronitrile, pivalonitrile and capronitrile.

The mixture of dinitrile and nitrile solvents provides other desired characteristics such as low electrolyte viscosity and high ionic conductivity.

In certain embodiments, the mixture/combination of dinitrile and nitrile solvents may be selected from the group consisting of glutaronitrile (DN-5), adiponitrile (DN-6), butyronitrile and pivalonitrile.

In certain embodiments, the mixture of dinitrile and nitrile solvents may be present in an amount of about 10-40% of the total volume of the electrolyte.

In certain embodiments, the volume ratio of the dinitrile solvent to the nitrile solvent may be in the range of about 90:10 to 50:50. In some embodiments, the volume ratio of dinitrile solvent to nitrile solvent may be about 75:25.

In certain embodiments, a mixture of adiponitrile (DN-6) with butyronitrile may be present in an amount of about 20-40% of the total volume of the electrolyte. In some embodiments, the amount of the mixture of adiponitrile (DN-6) with butyronitrile may be about 25% of the total volume of the electrolyte.

The electrolyte may include one or more electrolyte additives. Additives have been found to improve the cycling performance of the high voltage batteries. In general, the additives can be classified as lithium salt additives and organic non-ionic additives. Examples for additives may be selected from solid electrolyte interface (SEI) forming additives, cathode protecting agents, salt stabilizers, overcharge protecting additives, lithium depositing additives, solvation enhancers, as well as corrosion inhibitors and wetting agents. The additives may be further selected based on their reduction potentials.

In certain embodiments, the additives may be one or more selected from the group consisting of 4-vinyl-1,3-dioxolan-2-one (VEC), 4-fluoro-1,3-dioxolan-2-one (FEC), vinyl carbonate (VC), ally methyl carbonate (AMC), dimethyl dicarbonate (DMDC), allyl ethyl carbonate (AEC), diallyl carbonate (DAC), 4-chloro-1,3-dioxolan-2-one (ClEC), glycol sulfite (ES), dimethyl sulfite (DMS), 1,3,2-dioxathiolane 2,2-dioxide (132 DOT), dimethyl carbonate (DMC), propylene sulfate (PSO4), ethyl fluoroacetate (EFA), methyl fluoroacetate (MFA), trifluoromethyl maleic anhydride (TF-MMA), methyl phenyl carbonate (MPC), N,N-dimethyltrifluoroacetamide 2-MTFA, ethyl 3-furoate (E-3-F), 1,3-propylene sulfite (1,3-PSF).

In certain embodiments, the additives may be one or more selected from the group consisting of vinyl carbonate (VC), 4-fluoro-1,3-dioxolan-2-one (FEC) and 4-vinyl-1,3-dioxolan-2-one (VEC).

In certain embodiments, the additives may be added in an amount of about 0.1-10% of the total volume of the electrolyte.

The lithium salt provides the lithium ions that are active at both of the battery electrodes of a secondary battery. The lithium salt dissolves into the non-aqueous solvents. The selection of the particular salt can be based on appropriate solubility, ion mobility and stability. The selection of salts can be influenced by the stability of the resulting electrolyte.

Various electrolyte salts may be used, including lithium salts that are generally used in the field. In some embodiments, lithium salts may be selected from the group consisting of lithium hexafluorophosphate, lithium bis(oxalato) borate, lithium tetrafluoroborate (LiBF4), lithium bis (trifluoromethanesulfonyl)imide (LiNTf$_2$), lithium trifluoromethanesulfonate, lithium tetrachlorogallate, lithium tetrachloroaluminate and lithium hexafluoroarsenate (V) and any combinations thereof. The electrolyte may include the electrolyte salts in a concentration ranging from about 1 M to 1.5 M.

In another aspect, the present application provides a lithium ion battery utilizing the above described electrolyte, which may be stable at voltages of greater than about 5 V. The battery may include a cathode, an anode, and the above described electrolyte. A separator between the cathode and anode may also be included.

Various cathode materials may be used, including the materials that are generally used in the field. In certain embodiments, the cathode material may include those selected from the group consisting of cobalt oxide, manganese oxide, nickel oxide, nickel cobalt aluminum oxide, iron phosphate, nickel manganese oxide and nickel cobalt manganese oxide.

Various anode materials may be used, including the materials that are generally used in the field. In certain embodiments, the anode material may include those selected from the group consisting of graphite, hard carbon, tin, germanium and silicon.

The lithium ion battery can ensure overcharge safety of a high voltage battery. Not only the lithium ion battery has stable cycle performance at normal temperature and small changes of internal resistance, the preparation process for the high-voltage lithium ion battery electrolyte is simple and easy to implement and has good market prospects.

In certain embodiments, the lithium ion battery has a cyclic performance of greater than about 300 cycles and with capacity retention of greater than about 80%.

Hereinafter the present application will be further illustrated by the following non-limitative examples.

Example 1

Cyclic Voltammetry Analysis of Electrolytes with Different Solvent Systems

The measurement was performed in a coin cell. A graphite electrode was used as the working electrode and lithium metal was used as both the counter electrode and the reference electrode. A separator was placed between the lithium metal electrode and the graphite electrode.

The working electrode tapes were fabricated at room temperature using MCMB (MesoCarbon MicroBeads) graphite powder as the active material, polyvinylidene difluoride (PVDF) resin, and conductive carbon black (SuperP) with 80:10:10 wt. % loading. Freestanding electrodes were dried at 90° C. in an oven before being transferred to a helium filled glove box with H$_2$O and O$_2$<1 ppm.

Stainless steel CR2032-type coin cells were used. The cell was comprised of a disk of the working electrode, glass fiber separators saturated with electrolyte, and Li foil. These cells were examined on an Arbin battery tester in the potentiodynamic (cyclic voltammetry) mode at a fixed temperature of 25° C. Each step was 0.5 mV/s. The cells were swept from the 3.0 V to 8.0 V to 0.0 V to 3.0 V (vs. Li) for one cycle to examine the stability of dinitrile solvents at different voltages.

Figure 1A:
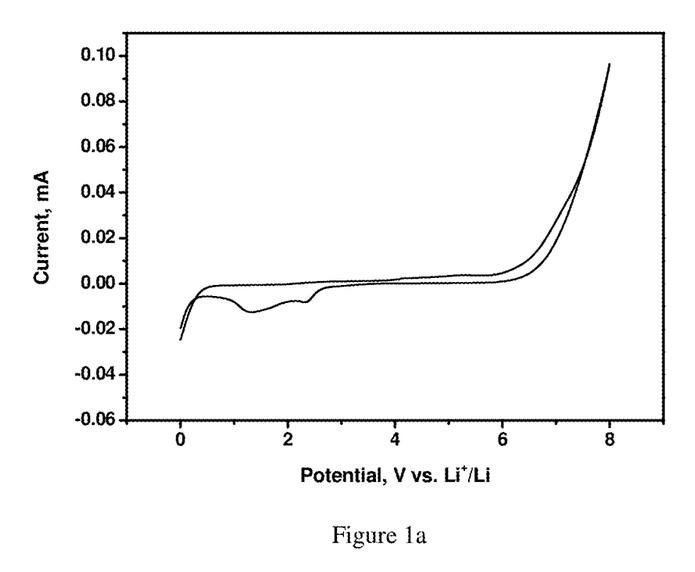
FIGS. 1a and 1b show cyclic voltammetry measurement of Electrolyte A and Electrolyte B, respectively.
Figure 1B:
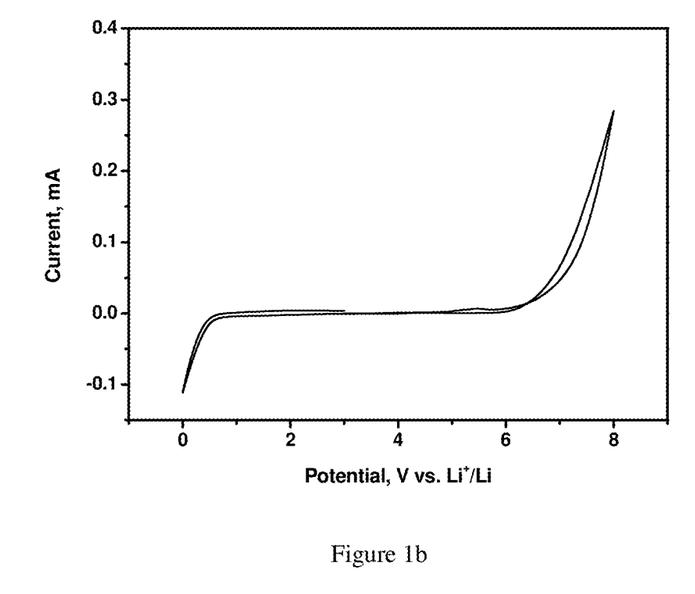

Different dinitrile solvent candidates were tested by scanning the potential at an inert electrode and observing the anodic current. The onset oxidation potentials and the boiling points of different dinitrile solvent candidates have been measured (Table 1). The dinitriles with oxidation potential >5 V are the potential candidates such as DN-3, DN-4, DN-5, DN-6, DN-7 and ethylene bis(cyanoacetate) (DN-8-04) to be solvents in the high voltage electrolyte system. In the mixed-solvent electrolyte solutions, two electrolytes were studied and shown as examples (FIGS. 1a and 1b). Electrolyte A had a 1 mole/liter of LiNTf$_2$ electrolyte salt concentration in a solvent of adiponitrile. Electrolyte B had a 1 mole/liter of LiNTf$_2$ electrolyte salt concentration in a mixture of adiponitrile and butyronitrile (volume ratio in 75:25). The mixture is in an amount of about 25% of the total volume of the high voltage electrolyte. The cyclic voltammetry results of Electrolyte A and Electrolyte B are plotted in FIGS. 1a and 1b respectively. Both Electrolytes A and B exhibited oxidation of the electrolyte at around 6 V as indicated by a rapid increase in negative current. Electrolyte A also exhibited a reduction reaction between the range of 0.2 V and 2.2 V; meanwhile, the addition of butyronitrile in the electrolyte can improve the resistance to reduction (FIG. 1b).

TABLE 1

The onset oxidation potentials and the boiling points of different dinitrile solvent candidates.

| Solvent | Boiling Point/ ° C. | Abbr. | Oxidation Potential/ V vs. Li/Li$^+$ |
|---|---|---|---|
| Malononitrile | 218 | DN-3 | 5.91 |
| Succinonitrile | 268 | DN-4 | 5.87 |
| Glutaronitrile | 284 | DN-5 | 6.09 |
| Adiponitrile | 295 | DN-6 | 6.19 |
| Pimelonitrile | 308 | DN-7 | 6.21 |
| 3,3'-(Ethylenedioxyl)dipropionitrile | >310 | DN-8-O2 | 4.80 |
| Ethylene bis(cyanoacetate) | >310 | DN-8-O4 | 5.01 |
| 3,3'-iminodipropionitrile | >310 | DN-6-N | 4.03 |
| Ethyl 2,3-dicyanopropionate | >310 | AN-4-E2 | 4.67 |
| Methyl 2,3-dicyano-2-methyl-butanoate | >310 | AN-5-E1 | 4.70 |
| 2-Methyl-2-phenylhexanedinitrile | >310 | AN-6-Ph-1 | 4.09 |
| 1,2,3-Tris(2-cyanoethoxy)propane | >310 | TN-12-O3 | 4.17 |

Example 2

Potentiodynamic Scans and Cycling Test (Half Cell) of Electrolytes with Different Additives The measurement was performed in a coin cell. A graphite electrode was used as the working electrode and lithium metal was used as both the counter electrode and the reference electrode. A separator was placed between the lithium metal electrode and the graphite electrode.

The working electrode tapes were fabricated at room temperature using MCMB (MesoCarbon MicroBeads) graphite powder as the active material, polyvinylidene difluoride (PVDF) resin, and conductive carbon black (SuperP) with 80:10:10 wt. % loading. Freestanding electrodes were dried at 90° C. in an oven before being transferred to a helium filled glove box with $H_2O$ and $O_2$<1 ppm.

Stainless steel CR2032-type coin cells were used. The cell was comprised of a disk of the working electrode, glass fiber separators saturated with electrolyte, and Li foil. These cells were examined on an Arbin battery tester in the potentio-dynamic (cyclic voltammetry) mode at a fixed temperature of 25° C. Each step was 0.5 mV/s. The cells were swept from the 2.5 V to 0.0 V to 2.5 V (vs. Li) for two cycles to examine the effectiveness of additives on stabilizing the interface of the MCMB electrode and electrolyte.

Figure 2A:
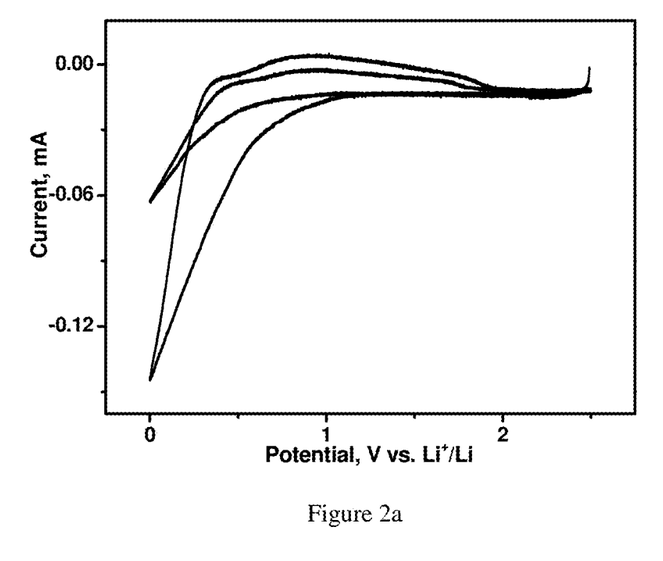
FIGS. 2a and 2b show potentiodynamic scan and cycling test of a half cell in example 2 with no additive, respectively.
Figure 2B:
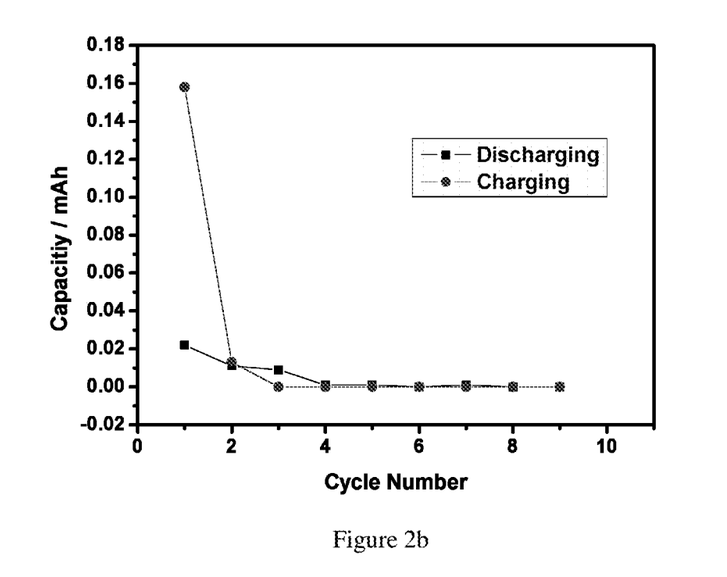

Different additive candidates (in 5 volume %) were added into the cell and tested by scanning the potential at an inert electrode and observing the cathodic current. Examples of cyclic voltammetry scans are shown in FIGS. 2a-2b, 3a-3b and 4a-4b. It would appear that the pure dinitrile solvent without any additives exhibited a poorly defined reversible sweep after a large decomposition wave in the first cycle with no subsequent reversibility (FIGS. 2a and 2b). The pure nitrile solvent also showed no ability to support reversible intercalation thereby resulting in poor cycling behavior. Examination of the cells after testing revealed yellowish-brown decomposition products across both electrolyte separators, which are consistent with nitrile decomposition.

Figure 3A:
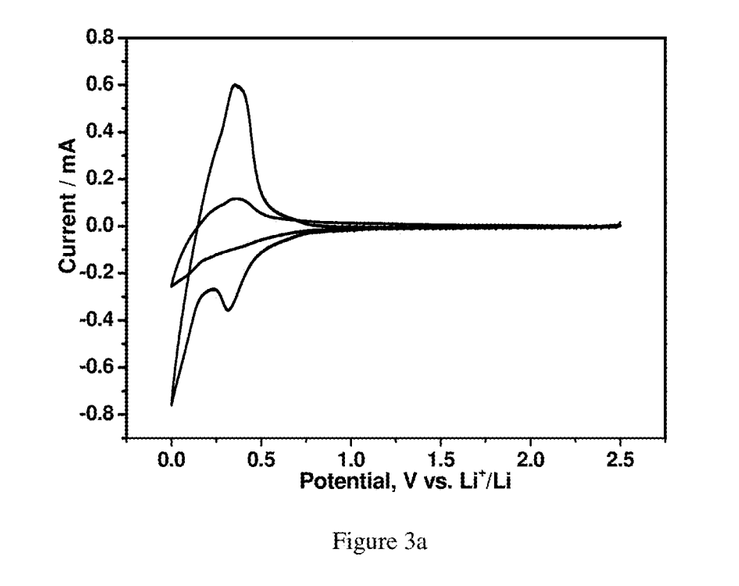
FIGS. 3a and 3b show potentiodynamic scan and cycling test of a half cell in example 2 with additive vinylboronic acid pinacol ester (BO-2), respectively.
Figure 3B:
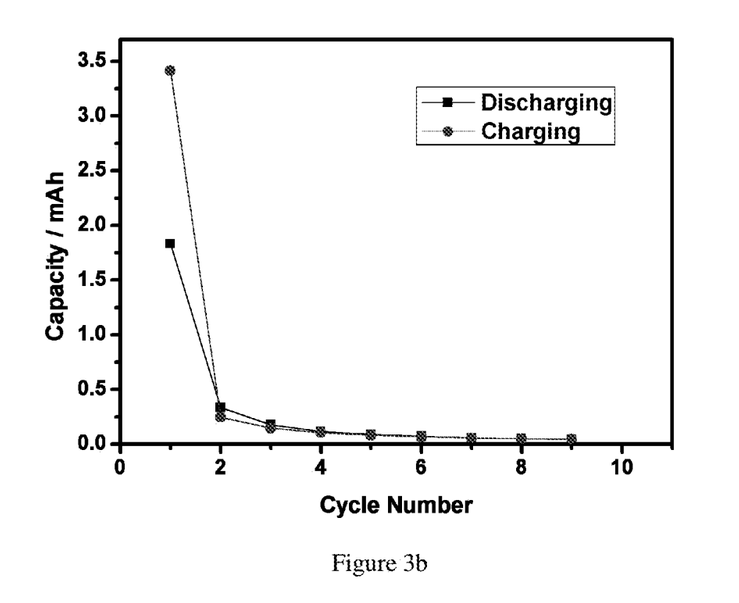
Figure 4A:
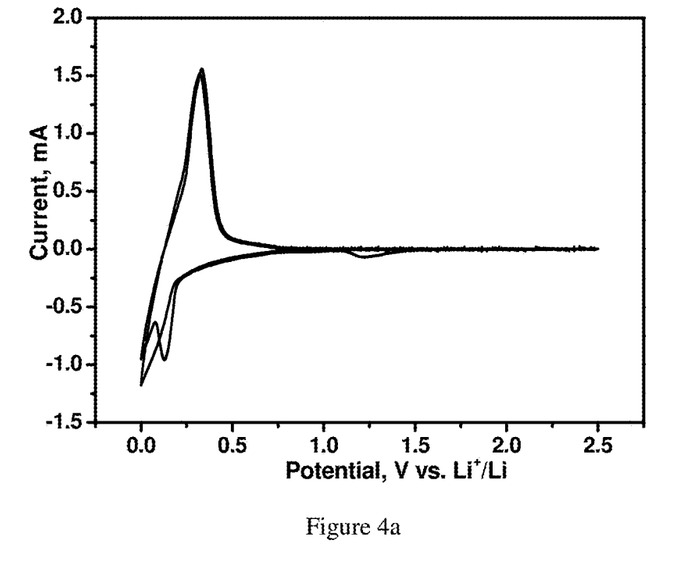
FIGS. 4a and 4b show potentiodynamic scan and cycling test of a half cell in example 2 with additive 4-vinyl-1,3-dioxolan-2-one (VEC), respectively.
Figure 4B:
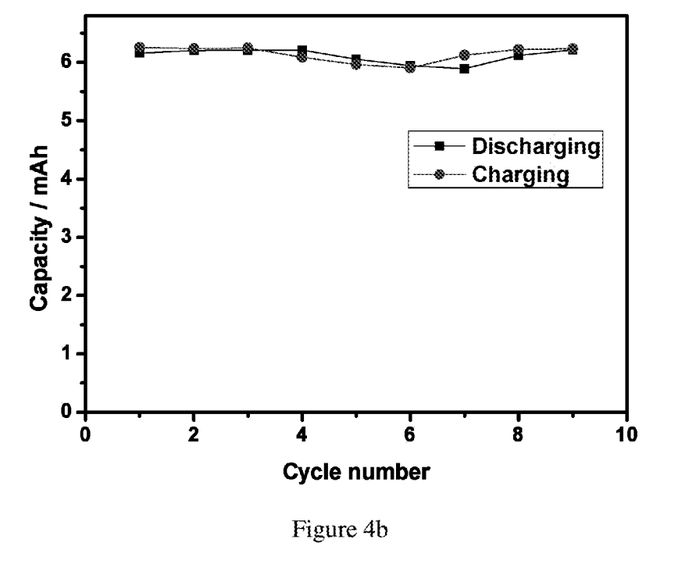

Using improper additives (e.g. vinylboronic acid pinacol ester (BO-2)), the first and the second cycles behave lesser degree of overlapping as shown in FIGS. 3a and 3b. With proper additives (e.g. VEC), a dramatic improvement in cycle performance was observed. Reversible cycling with high degree of overlapping could be observed in the cyclic voltammogram (FIGS. 4a and 4b). The dinitrile solvent became stable with respect to graphitic carbon as the well known lithium intercalation into graphite at potentials <0.5 V showed good initial reversibility in cycle. In sharp contrast, the dinitrile electrolyte solvent with additive VEC was found to be far superior to additive BO-2 in stabilizing the electrolyte and hence it exhibited good capacity retention after 10 cycles. The additive VEC effectively stabilized the interfacial region in a manner that prevented decomposition of the dinitrile solvent and enabled lithiation/dilithiation to occur on the electrode. The onset reduction potentials of different additive candidates have been measured and summarized in Table 2. (Remark: In the third column of Table 2 (i.e. reduction potential/V (vs. Li/Li$^+$), those marked with 'X' mean that the onset reduction potential of the additives cannot be identified by the electrochemical method.)

TABLE 2

The onset reduction potentials of different additive candidates.

| Additives | Abbr. | Reduction Potential/ V (v.s. Li/Li+) | Reversi-bility in half cell (C/Li) |
|---|---|---|---|
| No additive | | | N |
| Succinic anhydride | SA | 1.33 | N |
| Trimethylboroxine | BO-1 | X | N |
| Vinylboronic acid pinacol ester | BO-2 | 1.09 | N |
| Allylboronic acid pinacol ester | BO-3 | X | N |
| 4-Fluoro-1,3-dioxolan-2-one | FEC | 1.14 | Y |
| 4-Vinyl-1,3-dioxolan-2-one | VEC | 1.07 | Y |
| Vinyl carbonate | VC | 1.08 | Y |
| Allyl methyl carbonate | AMC | 1.21 | Y |
| Dimethyl dicarbonate | DMDC | 1.1 | Y |
| Ethyl 2,3-dicyanopropionate | AN-4-E2 | X | N |
| Vinyl acetate | VA | 1.14 | N |
| Allyl acetate | AA | 1.17 | N |
| Divinyl adipate | ADV | 1.23 | N |
| Acetone | DMK | 1.17 | N |
| 3-pentanone | DEK | X | N |
| Allyl ethyl carbonate | AEC | 1.11 | Y |
| Diallyl carbonate | DAC | 1.11 | Y |
| Diethyl carbonate | DEC | 0.83 | N |
| Ethyl methyl carbonate | EMC | 1.31 | N |
| 4-Chloro-1,3-dioxolan-2-one | CIEC | 1.83 | Y |
| Dimethyl oxalate | DMO | 1.9 | N |
| 1-Methoxy-1,3-butadiene | EE-1 | 0.81 | N |
| 2-butanone | EMK | 1.11 | N |
| 2,3-butanedione | AMK | 1.57 | N |
| γ-butyrolactone | GBL | 1.14 | N |
| δ-valerolactone | DVL | 0.99 | N |
| α-Bromo-γ-butyrolactone | BrGBL | X | N |
| trans-β-Nitrostyrene | NE-2 | X | N |
| trans-3-Methoxy-β-nitrosytrene | NE-3 | X | N |
| 2-Fluoro-β-nitrosytrene | NE-4 | X | N |
| 3-Furonitrile | CN-F | 0.91 | N |
| Acrylonitrile | AAN | 1.68 | N |
| Dimethyl vinylphosphonate | PE-1 | X | N |
| Allyltriethylsilane | SA-1 | X | N |
| Glycol sulfite | ES | 1.95 | Y |
| dimethyl sulfite | DMS | 1.41 | Y |
| diethyl sulfite | DES | 1.19 | N |
| γ-Propane sultone | PS | 1.11 | N |
| 1,2-Propyleneglycol sulfite | 1,2-PS | 1.65 | N |
| 1,3,2-Dioxathiolane 2,2-dioxide | 132 DOT | 1.87 | Y |
| 1,3-Propanediol cyclic sulfate | 1,3-PCS | 1 | N |
| Allyl methyl sulfone | AMS | 0.98 | N |
| Triethylvinylsilane | SE-1 | 1.07 | N |
| Triethoxyvinylsilane | SE-4 | 1.16 | N |
| Tris(trimethylsilyl) borate | TTMSiB | X | N |
| Tris(trimethylsilyl) phosphate | TTMSiP5 | 0.825 | N |
| Triacetoxy(vinyl)silane | TAVSi | 1.31 | N |
| Trichloro(1H,1H,2H,2H-perfluorooctyl)silane | 3Cl5FSi | X | N |
| 3-(Methylsulfonyl)-1-propyne | 3MSIP | 1.65 | N |
| Dimethyl carbonate | DMC | 0.81 | Y |
| 2-Vinylpyridine | 2VP | 0.94 | N |
| 4-Cyclopentene-1,3-dione | 4CPI3D | X | N |
| Succinimide | SNO | 1.77 | N |
| Methyl benzoate | Mben | X | N |
| 1,4-Butane sultone | 14BS | 0.87 | N |
| Propylene sulfate | PSO4 | 0.79 | Y |
| N,N-Dimethylformamide | N,N-DMF | 1.04 | N |
| Phenylcyclohexane | PCH | X | N |
| 1,3-Butyleneglycol sulfite | 13BGS | 1.23 | N |
| Ethyl fluoroacetate | EFA | 1.33 | Y |
| Methyl Fluoroacetate | MFA | 1.34 | Y |
| 4-Fluorophenyl Acetate | 4FPA | X | N |
| Anisole | Anisole | 1.02 | N |
| 12-Crown-4 | 12-Crown-4 | 1.01 | N |
| Ethyl methanesulfonate | EMS | 1.09 | N |
| 4-Fluorotoluene | 4FT | 1.51 | N |
| Vinylene trithiocarbonate | VTC | 1.49 | N |
| Bis(trimethylsilyl)carbodiimide | BTMSiC | X | N |
| N,N-Diethyl-1,1,1-trimethylsilylamine | NNDE-111TMSI | X | N |
| Vinyltriisopropenoxysilane | VTIPO | X | N |
| 3-(Triethoxysilyl)propyl isocyanate | 3-TPIC | 0.98 | N |
| 1,1'-Sulfonyldiimidazole | 2-SDD | 1.69 | N |
| Maleic anhydride | MAH | X | N |
| Vinyltrisopropoxysilane | VTPPS | X | N |
| Trimethoxymethylsilane | 3-MMS | 1.08 | N |
| Tris(3-trimethoxysilylpropyl)-isocyanurate | T-3-TMI | X | N |
| 3-Isocyanatopropyltri-methoxysilane | 3-ICPMS | 0.5 | N |
| Trifluoromethyl maleic anhydride | TFMMA | X | N |
| Methyl phenyl carbonate | MPC | 0.65 | Y |
| Hexamethyl phosphoryl | 6-MPT | X | N |

TABLE 2-continued

The onset reduction potentials of different additive candidates.

| Additives | Abbr. | Reduction Potential/ V (v.s. Li/Li+) | Reversibility in half cell (C/Li) |
|---|---|---|---|
| triamide, 99% | | | |
| 1,1,1,3,3,3-Hexamethyldisilazane, 98% | 6-MDS | X | N |
| N,N-Dimethyltrifluoroacetamide | 2-MTFA | 1.24 | Y |
| N-(Triphenylphosphoranylidene)-aniline | N3PPDA | X | N |
| Tris(pentafluorophenyl)phosphine | TPFPP | X | N |
| 4-Fluorobenzonitrile | 4-FBN | 1.269 | N |
| 3-Fluorobenzonitrile | 3-FBN | 1.177 | N |
| 2-Fluorobenzonitrile | 2-FBN | X | N |
| Tetraethylene glycol dimethyl ether | TGDE | X | N |
| Fluoroacetone | FA | 1.87 | Y |
| Ethyl nicotinate | EN | X | N |
| Methyl isonicotinate | MIC | X | N |
| Ethyl 2-furoate | E-2-F | X | N |
| Ethyl 3-furoate | E-3-F | 1.86 | Y |
| Ethyl 2-thiophenecarboxylate | E-2-TPC | X | N |
| 3,4-Pyridinedicarboxylic andydride | 3,4-PDCA | X | N |
| 2-Bromoanisole | 2-BA | 1.32 | N |
| Methyl picolinate | MP | X | N |
| 1,3-Propylene sulfite | 1,3-PSF | 1.05 | Y |

Example 3

Cycling of LiCoO$_2$ vs. Graphite Lithium Ion Battery with the Dinitrile and Nitrile Electrolyte Solvent The measurement was performed in a coin cell. Stainless steel CR2032-type coin cells were used. It was assembled with disks of both the positive and negative electrodes and glass fiber separators saturated with electrolyte. The LiCoO$_2$ cathode was fabricated at room temperature using LiCoO$_2$ powder as the active material, polyvinylidene difluoride (PVDF) resin, and conductive carbon black (SuperP) with 80:10:10 wt. % loading. The graphite anode was fabricated at room temperature using MCMB (MesoCarbon Micro-Beads) graphite powder as the active material, polyvinylidene difluoride (PVDF) resin, and conductive carbon black (SuperP) with 80:10:10 wt. % loading. Freestanding electrodes were dried at 90° C. in an oven before being transferred to a helium filled glove box with H$_2$O and O$_2$<1 ppm.

Figure 5A:
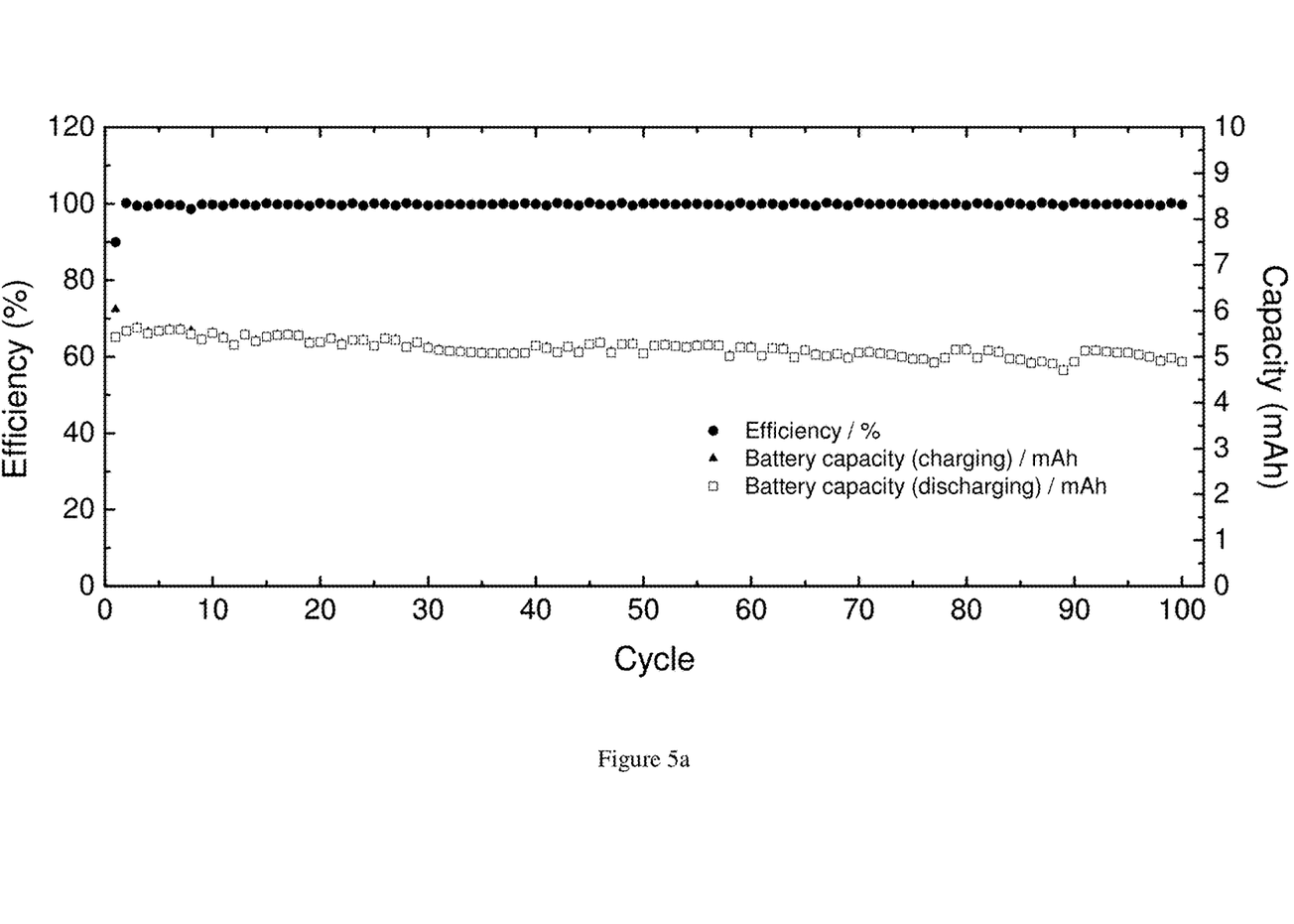
FIG. 5a shows reversibility of full cells in example 3 using 5% of vinyl ethylene carbonate (VEC) in adiponitrile (DN-6) with butyronitrile (25% by volume, volume ratio of DN-6 to butyronitrile is 75:25) with 1M $LiNTf_2$+0.25M $LiBF_4$ salts.
Figure 5B:
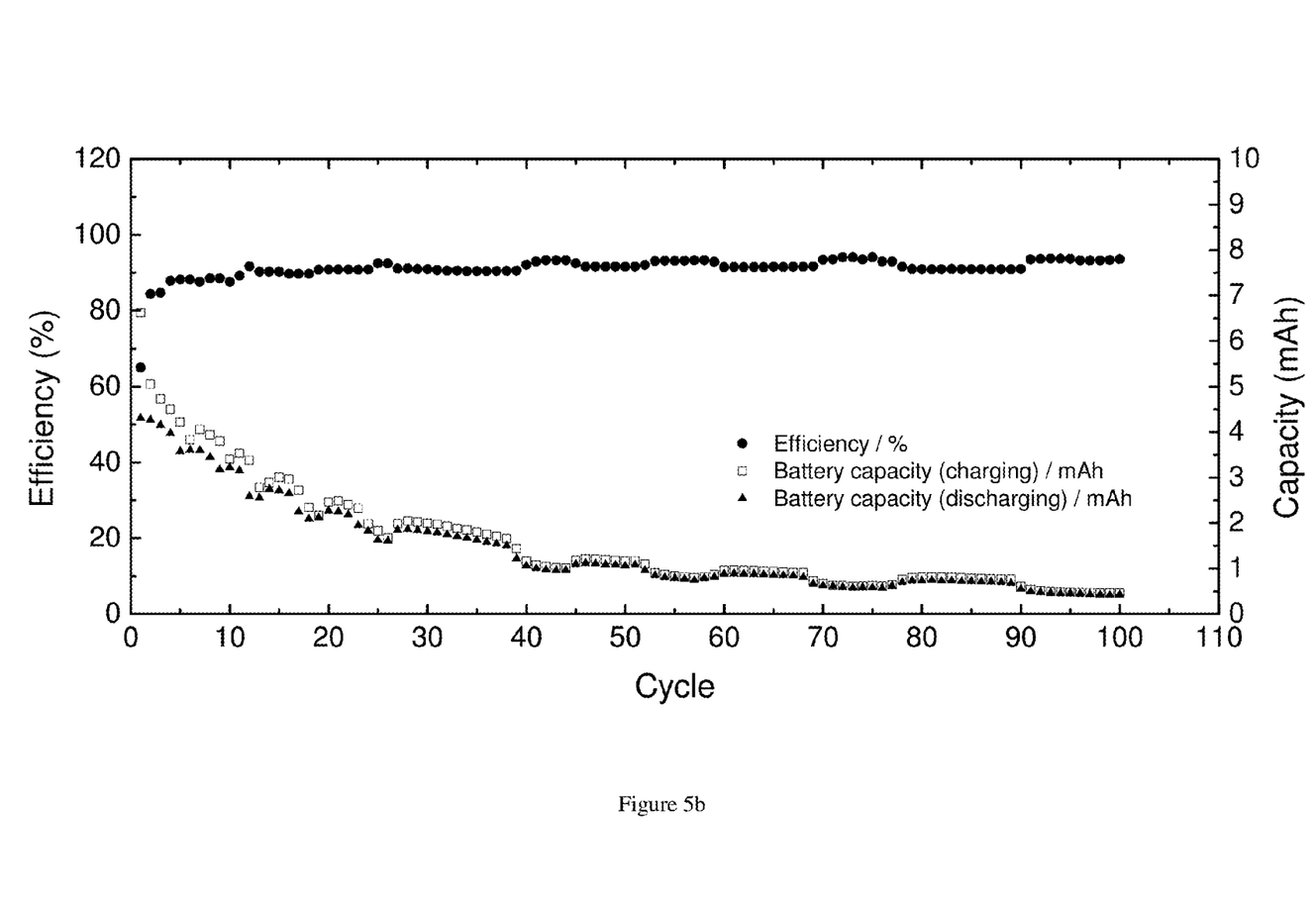
FIG. 5b shows reversibility of full cells in example 3 using 4-chloro-1,3-dioxolan-2-one (ClEC) in adiponitrile (DN-6) with butyronitrile (25% by volume, volume ratio of DN-6 to butyronitrile is 75:25) with 1M $LiNTf_2$+0.25M $LiBF_4$ salts.

In the actual battery performance test, different additive compounds were used to fabricate full coin cells using adiponitrile (DN-6) with butyronitrile (25% by volume, volume ratio of DN-6 to butyronitrile is 75:25) as the electrolyte solvent. The electrolyte contained 1 M of LiNTf$_2$ and 0.25 M of LiBF$_4$ salts. The charge/discharge rates were 0.5 C. Examples of charging-discharging performance of the full cells using 5% of vinyl ethylene carbonate (VEC) and 4-chloro-1,3-dioxolan-2-one (CIEC) as the additives in the electrolyte are shown in FIGS. 5a and 5b respectively. With proper additives (e.g. VEC), the battery capacity retention can be over 80% after 100 charge-discharge cycles (FIG. 5a); however, using improper additives (e.g. CIEC) can cause significant battery capacity fade (FIG. 5b). The reversibility of full cells using different additives have been studied and summarized in Table 3. Among them, vinyl carbonate (VC), 4-fluoro-1,3-dioxolan-2-one (FEC) and 4-vinyl-1,3-dioxolan-2-one (VEC) could be the possible additives in the high voltage electrolyte.

TABLE 3

Battery capacity retention using different additives.

| Additives | Abbr. | Capacity retention after 100 charge-discharge cycles |
|---|---|---|
| 4-Fluoro-1,3-dioxolan-2-one | FEC | 87 |
| 4-Vinyl-1,3-dioxolan-2-one | VEC | 84 |
| Vinyl carbonate | VC | 86 |
| Allyl methyl carbonate | AMC | 39 |
| Dimethyl dicarbonate | DMDC | 0 |
| Allyl ethyl carbonate | AEC | 24 |
| Diallyl carbonate | DAC | 0 |
| 4-Chloro-1,3-dioxolan-2-one | CIEC | 11 |
| Glycol sulfite | ES | 20 |
| Dimethyl sulfite | DMS | 3 |
| 1,3,2-Dioxathiolane 2,2-dioxide | 132 DOT | 67 |
| Dimethyl carbonate | DMC | 0 |
| Propylene sulfate | PSO4 | 0 |
| Ethyl fluoroacetate | EFA | 0 |
| Methyl Fluoroacetate | MFA | 0 |
| trifluoromethyl maleic anhydride | TFMMA | 76 |
| Methyl phenyl carbonate | MPC | 15 |
| N,N-Dimethyltrifluoroacetamide | 2-MTFA | 0 |
| Fluoroacetone | FA | 0 |
| Ethyl 3-furoate | E-3-F | 0 |
| 1,3-Propylene sulfite | 1,3-PSF | 69 |

Figure 6A:
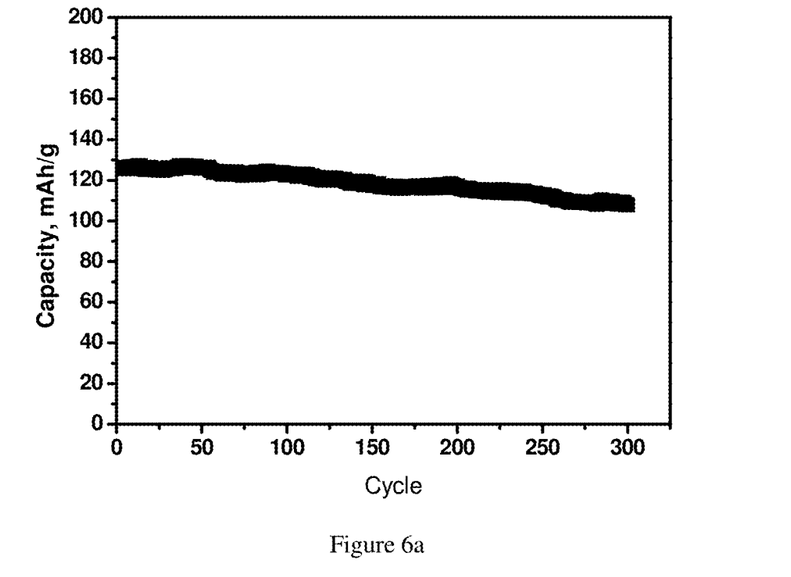
FIGS. 6a and 6b show cyclic performance of a $LiCoO_2$/graphite full cell utilizing 5% of vinyl ethylene carbonate (VEC) in adiponitrile (DN-6) with butyronitrile (25% by volume, volume ratio of DN-6 to butyronitrile is 75:25) with 1M $LiNTf_2$+0.25M $LiBF_4$ salts.
Figure 6B:
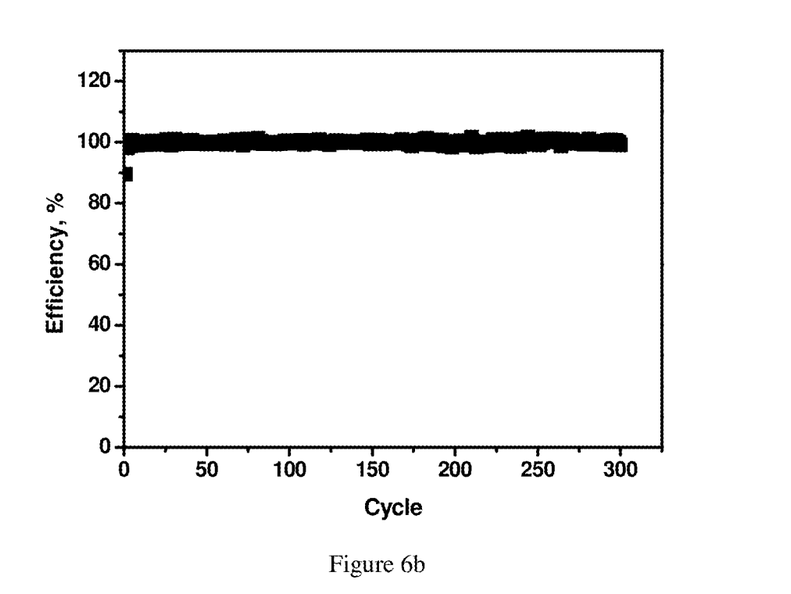

FIG. 6a shows the cycling performance of the lithium ion battery utilizing the electrolyte solvents (i.e. adiponitrile (DN-6) and butyronitrile with a volume ratio of 75:25, and in an amount of 25% by volume of the total volume of the electrolyte). With appropriate additives (VEC), the electrolyte solvents showed ability to support reversible intercalation thereby resulting in good cycling behavior. This was consistent with the aforementioned potentiodynamic scan (FIG. 5a). The full cell exhibiting capacity retentions in the dinitrite and nitrile electrolyte blend was 86% after 300 cycles (FIG. 6b). Except around 11% of the first cycle irreversible capacity losses, the current efficiency of each cyclic was close to 100%.

a) Surface Analysis of SEI (Solid Electrolyte Interfaces) Layer by SEM

Figure 7A:
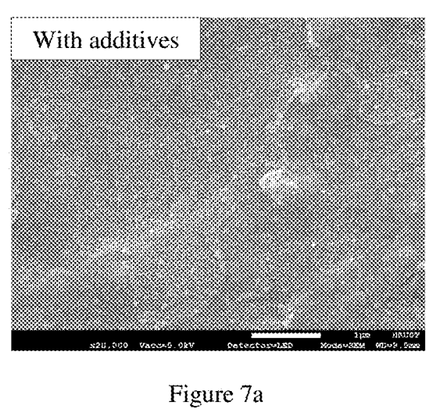
FIGS. 7a and 7b show SEM images of SEI layers formed on the graphite electrode surface in electrolyte with and without VC additives, respectively.
Figure 7B:
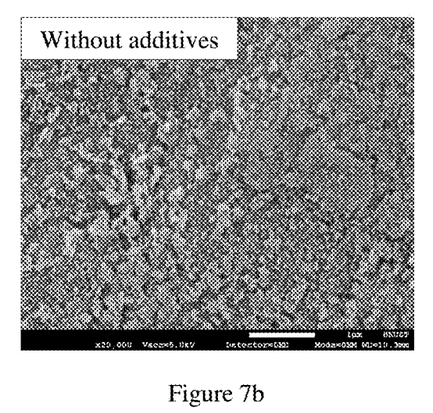
Figure 7C:
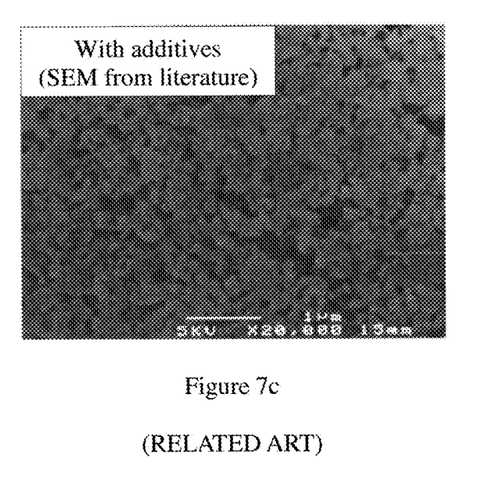
FIGS. 7c and 7d are SEM images described in the literature (*Journal of the Electrochemical Society,* 2004, 151, A1659-A1669).
Figure 7D:
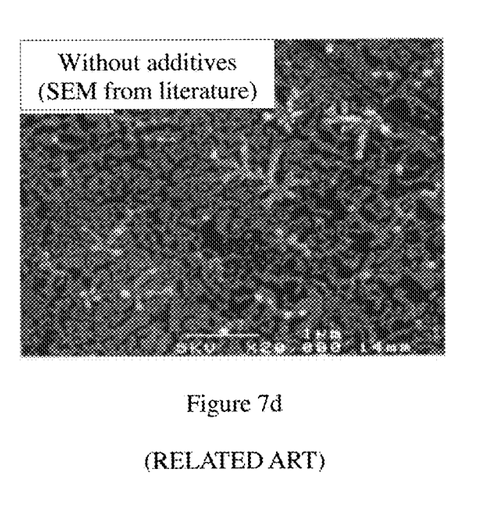
Figure 8A:
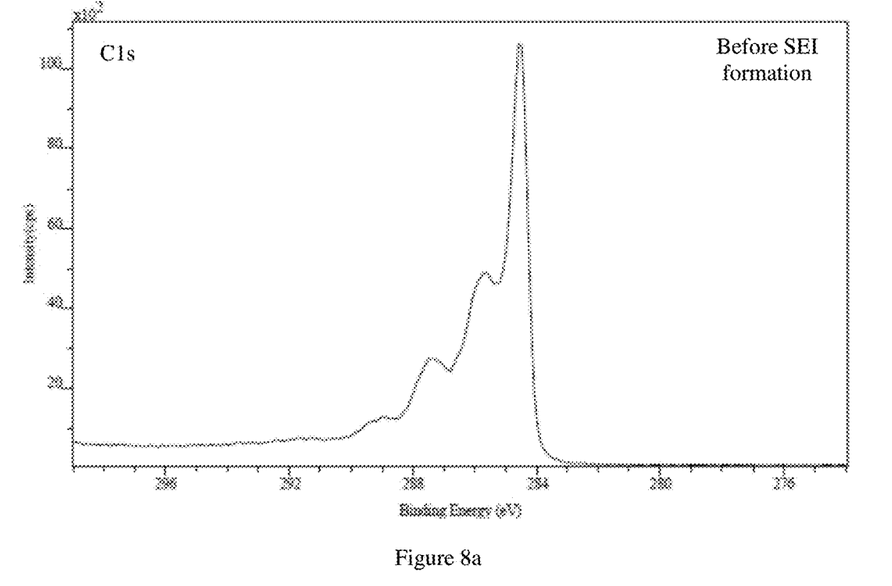
FIGS. 8a and 8b respectively show C1s XPS spectra before and after SEI layers formed on composite graphite with VC additives in electrolyte solvent.
Figure 8B:
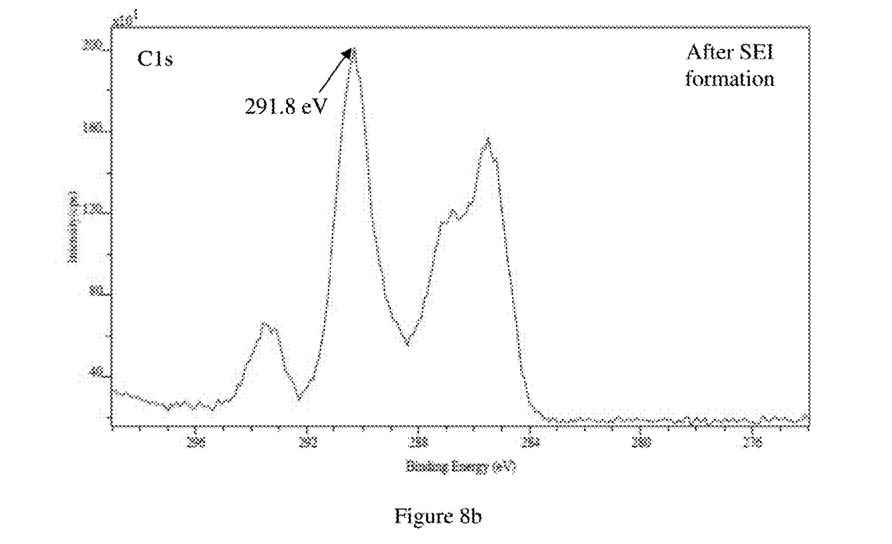
Figure 8C:
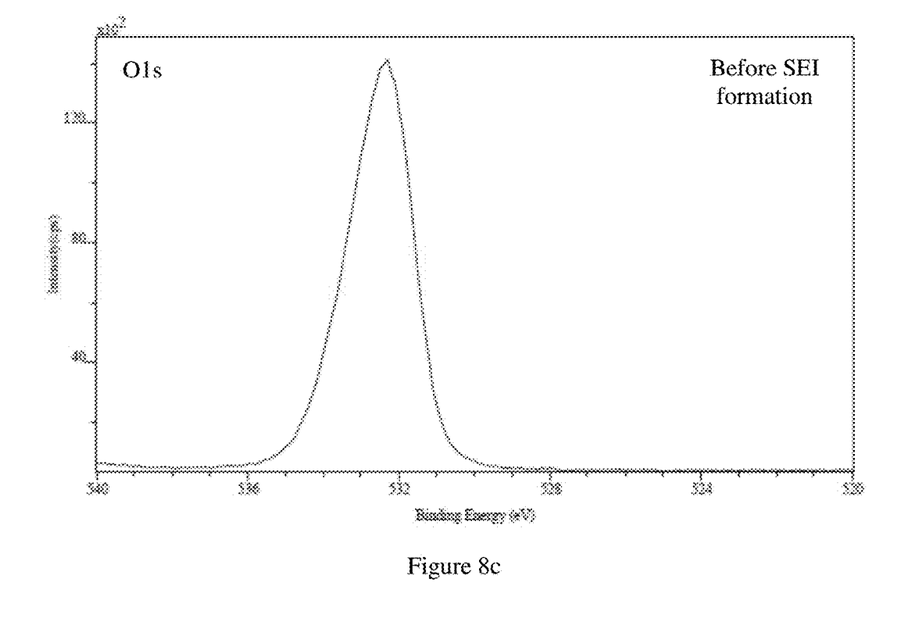
FIGS. 8c and 8d respectively show O1s XPS spectra before and after SEI layers formed on composite graphite with VC additives in electrolyte solvent.
Figure 8D:
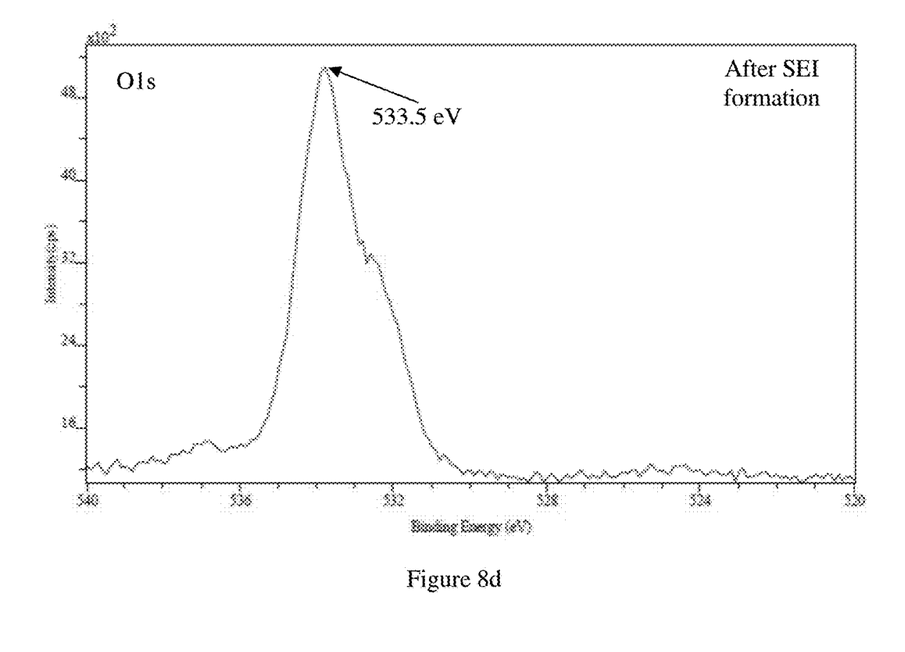

The SEI layer formed on the graphite electrode surface of the above full coin cell using vinyl carbonate (VC) as additive and adiponitrile (DN-6) with butyronitrile as electrolyte solvent is compared with the one free of VC additive. FIGS. 7a and 7h show SEM images of the solid electrolyte interface layers formed on the graphite electrode surface. The SEI layer was formed after the first lithium intercalation-deintercalation cycle. The specimen after the first cycle was transferred into the glove box and scraped from the copper foil current collector, washed in the electrolyte solvent and dried under vacuum to remove the residual electrolyte. The change in morphology of the graphite electrode in different electrolyte compositions was investigated by a Field Emission Scanning Electron Microscopy. The SEM image of the SEI layer in the VC-containing electrolyte showed a very smooth surface morphology, as shown in FIG. 7a. The VC-free derived SEI layer FIG. 7h had a non-homogeneous morphology. In comparison, the morphology of SEI formed from the VC-containing electrolyte is similar to the results reported in the literature (*Journal of the Electrochemical Society*, 2004, 151, A1659-A1669) (FIGS. 7c and 7d). It proved that with proper additives, SEI layer could be formed on the graphite electrode surface using the developed high voltage electrolyte.

b) Surface Analysis of SEI (Solid Electrolyte Interfaces) Layer by XPS

FIGS. 8a-8d showed the C1s and O1s XPS spectra for the SEI layers formed on the composite graphite after the first lithium-intercalation-deintercalation. The graphite anode samples were obtained from a half cell. The electrode pieces were mounted on the XPS sample holder in an Ar glove box and transported to the analysis chamber under an Ar-atmosphere to avoid air-exposure. The SEI layer (FIGS. 8b and 8d) formed on the graphite anode in the electrolyte containing adiponitrile and butyronitrile showed new peaks related to the SEI layer at 291.8 eV (CO3) in C1s spectra and at 533.5 eV (C—O—C) in the O1s spectra. As reported in the literature (*Journal of the Electrochemical Society,* 2004, 151, A1659-A1669), the peaks would be assigned to the oxygen peak (C—O—C) and the carbon peak (CO3) in poly(VC). Hence, the developed VC-containing electrolyte could produce the SEI layer of poly(VC) on the graphite anode surface.

Certain features of the application have been described with reference to example embodiments. However, the description is not intended to be construed in a limiting sense. Various modifications of the example embodiments, as well as other embodiments of the application, which are apparent to persons skilled in the art to which the application pertains are deemed to lie within the spirit and scope of the application.

What is claimed is:

1. A high voltage electrolyte comprising an electrolyte solvent which comprises a mixture of a dinitrile solvent and a nitrile solvent, wherein the electrolyte is stable at voltage of about 5 V, wherein the volume ratio of the dinitrile solvent to the nitrite solvent is in the range of about 90:10 to 50:50, wherein the dinitrile solvent is adiponitrile and the nitrile solvent is butyronitrile, wherein the mixture of the dinitrile solvent and the nitrile solvent is in an amount of about 10-40% of the total volume of the high voltage electrolyte.

2. The high voltage electrolyte of claim 1 further comprising at least one additive.

3. The high voltage electrolyte of claim 2, wherein the additives are selected from the group consisting of vinyl carbonate (VC), 4-fluoro-1,3-dioxolan-2-one (FEC) and 4-vinyl-1,3-dioxolan-2-one (VEC).

4. The high voltage electrolyte of claim 2, wherein the additive is in an amount of about 0.1-10% by volume of the electrolyte solvent.

5. The high voltage electrolyte of claim 1, wherein the mixture of the dinitrile solvent and the nitrile solvent is in an amount of about 25% of the total volume of the high voltage electrolyte.

6. A lithium ion battery comprising a cathode, an anode and an electrolyte,
wherein the electrolyte comprises an electrolyte solvent comprising a mixture of a dinitrile solvent and a nitrile solvent,
wherein the lithium ion battery is stable at voltage of about 5 V,
wherein the volume ratio of the dinitrile solvent to the nitrile solvent is in the range of about 90:10 to 50:50,
wherein the dinitrile solvent is adiponitrile and the nitrile solvent is butyronitrile, and
wherein the mixture of the dinitrile solvent and the nitrile solvent is in an amount of about 10-40% of the total volume of the high voltage electrolyte.

7. The lithium ion battery of claim 6, wherein the electrolyte further comprises one or more additives.

8. The lithium ion battery of claim 7, wherein the additives are selected from the group consisting of vinyl carbonate (VC), 4-fluoro-1,3-dioxolan-2-one (FEC) and 4-vinyl-1,3-dioxolan-2-one (VEC).

9. The lithium ion battery of claim 7, wherein the additive is in an amount of about 0.1-10% by volume of the electrolyte solvent.

10. The lithium ion battery of claim 6, wherein the lithium ion battery has a cyclic performance of about 300 cycles and with a capacity retention of about 80%.

* * * * *